(12) United States Patent
Muraoka

(10) Patent No.: US 11,555,438 B2
(45) Date of Patent: Jan. 17, 2023

(54) EXHAUST DEVICE

(71) Applicant: SUZUKI MOTOR CORPORATION, Hamamatsu (JP)

(72) Inventor: Tetsuo Muraoka, Hamamatsu (JP)

(73) Assignee: SUZUKI MOTOR CORPORATION, Hamamatsu (JP)

(*) Notice: Subject to any disclaimer, the term of this patent is extended or adjusted under 35 U.S.C. 154(b) by 0 days.

(21) Appl. No.: 17/552,273

(22) Filed: Dec. 15, 2021

(65) Prior Publication Data
US 2022/0220873 A1 Jul. 14, 2022

(30) Foreign Application Priority Data
Jan. 8, 2021 (JP) ............................. JP2021-002008

(51) Int. Cl.
*F01N 13/02* (2010.01)
*F01N 13/08* (2010.01)
*B60K 13/04* (2006.01)

(52) U.S. Cl.
CPC .............. *F01N 13/08* (2013.01); *B60K 13/04* (2013.01); *F01N 2340/04* (2013.01); *F01N 2590/04* (2013.01)

(58) Field of Classification Search
CPC ......................... F01N 2340/04; F01N 2590/04
See application file for complete search history.

(56) References Cited

U.S. PATENT DOCUMENTS

2006/0236685 A1 10/2006 Ueshima et al. ............... 60/299
2007/0107419 A1* 5/2007 Taniguchi ............ F01N 13/02
60/299
2017/0183994 A1* 6/2017 Nakata ..................... F01N 1/003
2017/0184005 A1* 6/2017 Yamamoto ............. F01N 13/008
2019/0120130 A1* 4/2019 Kuroiwa .................. F01N 13/00
2020/0263584 A1 8/2020 Yagi et al.

FOREIGN PATENT DOCUMENTS

| EP | 3 235 714 A1 | 12/2015 |
|---|---|---|
| EP | 3 235 715 A1 | 12/2015 |
| EP | 3 236 034 A1 | 12/2015 |
| EP | 3 236 035 A1 | 12/2015 |
| EP | 3 236 036 A1 | 12/2015 |
| EP | 3 236 037 A1 | 12/2015 |

(Continued)

OTHER PUBLICATIONS

Extended European Search Report dated May 20, 2022, issued by the European Patent Office in corresponding application EP 21216463.6.

*Primary Examiner* — Jonathan R Matthias
(74) *Attorney, Agent, or Firm* — Stein IP, LLC

(57) ABSTRACT

An exhaust device for guiding exhaust gas from an exhaust pipe in front of an engine to a muffler in a rear of the engine is provided. The exhaust device includes a catalyst case in which a catalyst configured to purify the exhaust gas that passes through the exhaust pipe is accommodated, and a chamber in which a muffling chamber configured to reduce an exhaust noise is formed downstream of the catalyst case. The catalyst case is disposed in a range from a front space with respect to the engine to a front part of a lower space of the engine. The chamber is disposed so as to occupy at least a rear part of the lower space of the engine.

9 Claims, 7 Drawing Sheets

(56) References Cited

FOREIGN PATENT DOCUMENTS

| EP | 3 239 485 A1 | 12/2015 |
| EP | 3 805 534 A1 | 12/2015 |
| JP | 2012-052514 A | 3/2012 |
| JP | 2013-122249 A | 6/2013 |
| WO | WO 2016/098896 A1 | 6/2016 |
| WO | WO 2019/059258 A1 | 3/2019 |

* cited by examiner

EXHAUST DEVICE

CROSS-REFERENCE TO RELATED APPLICATIONS

The disclosure of Japanese Patent Application No. 2021-002008 filed on Jan. 8, 2021, including specification, drawings and claims is incorporated herein by reference in its entirety.

BACKGROUND

The present invention relates to an exhaust device.

In the related art, as an exhaust device of a straddle-type vehicle, a device in which a catalyst case is disposed on a lower side of an engine is known (for example, see Patent Literature 1). In the exhaust device disclosed in Patent Literature 1, four exhaust pipes extend downward from a front of an engine, and the four exhaust pipes are integrated into a single collecting pipe on the lower side of the engine to be connected to the catalyst case. One exhaust pipe is connected to downstream of the catalyst case, and the exhaust pipe extends to a side of a rear wheel and is connected to a muffler. When exhaust gas enters the muffler from the catalyst case, the exhaust gas is expanded in a muffling chamber in the muffler, so that an exhaust noise is reduced.

Patent Literature 1: JP-A-2012-052514

SUMMARY

According to one advantageous aspect of the present invention, there is provided an exhaust device, configured to guide exhaust gas from an exhaust pipe in front of an engine to a muffler in a rear of the engine, the exhaust device including:

a catalyst case in which a catalyst configured to purify the exhaust gas that passes through the exhaust pipe is accommodated; and a chamber in which a muffling chamber configured to reduce an exhaust noise is formed downstream of the catalyst case, wherein the catalyst case is disposed in a range from a front space of the engine to a front part of a lower space of the engine, and the chamber is disposed so as to occupy at least a rear part of the lower space of the engine.

DETAILED DESCRIPTION OF EXEMPLIFIED EMBODIMENTS

In the exhaust device disclosed in Patent Literature 1, the lower side of the engine is occupied by the collecting pipe and the catalyst case, and it is difficult to secure a muffling chamber with a sufficient volume on an upstream side of the muffler. Therefore, a volume of the muffling chamber in the muffler is increased, and a size of the muffler is increased.

The present invention has been made in view of this point, and an object of the present invention is to provide an exhaust device capable of securing a muffling chamber on a lower side of an engine and reducing a size of a muffler.

An exhaust device according to one aspect of the present invention guides exhaust gas from an exhaust pipe in front of an engine to a muffler in a rear of the engine. A catalyst case is provided downstream of the exhaust pipe, and a catalyst that purifies the exhaust gas that passes through the exhaust pipe is accommodated in the catalyst case. A chamber is provided downstream of the catalyst case, and a muffling chamber that reduces an exhaust noise is formed in the chamber. The catalyst case is disposed in a range from a front space to a front side of a lower space of the engine, and the chamber can occupy at least a rear part of the lower space of the engine. Since the lower space of the engine is not occupied by the catalyst case, the chamber is disposed in a wide range in the lower space of the engine, and the exhaust noise is reduced by the muffling chamber of the chamber. By securing the muffling chamber on an upstream side of the muffler, it is possible to reduce a size of the muffler. Therefore, in a state where a muffling performance is maintained, a risk of heat damage due to a surface of the muffler can be reduced by reducing the size of the muffler, and a degree of freedom in designing a muffler appearance can be improved.

Figure 1:
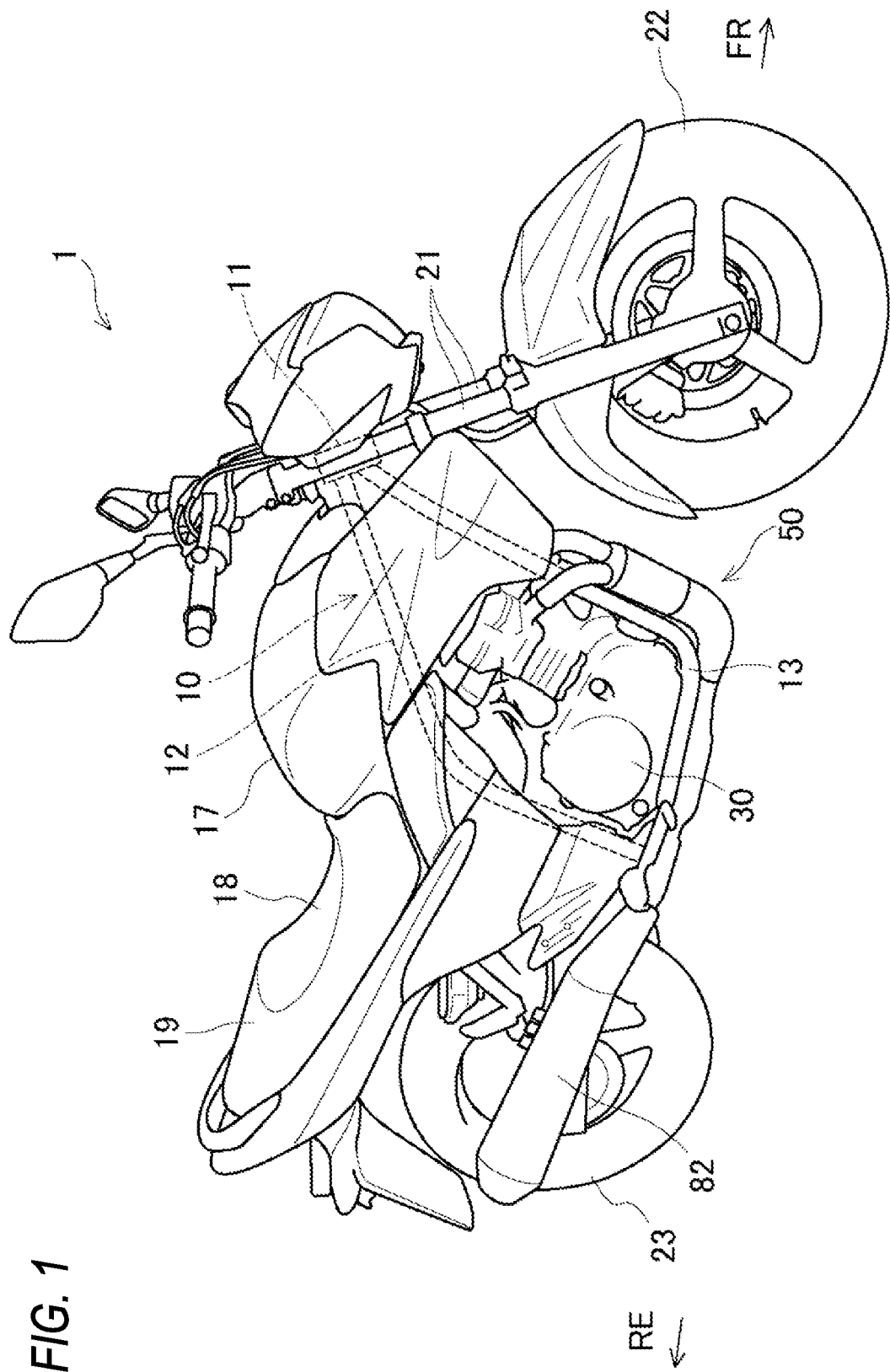
FIG. 1 is a right side view of a straddle-type vehicle according to a present embodiment.

Hereinafter, a present embodiment will be described in detail with reference to the accompanying drawings. FIG. 1 is a right side view of a straddle-type vehicle according to the present embodiment. In the following drawings, an arrow FR indicates a vehicle front, an arrow RE indicates a vehicle rear, an arrow L indicates a vehicle left side, and an arrow R indicates a vehicle right side.

As shown in FIG. 1, a straddle-type vehicle 1 is formed by mounting various components such as an engine 30 and an electrical system on a cradle type vehicle body frame 10. The vehicle body frame 10 includes a main tube 12 that extends rearward from a head pipe 11 and then bends downward, and a down tube 13 that extends downward from the head pipe 11 and then bends rearward. A rear side of the engine 30 is supported by the main tube 12, and a front side and a lower side of the engine 30 are supported by the down tube 13. A fuel tank 17 is supported on the main tube 12, and a rider seat 18 and a pillion seat 19 are provided in a rear of the fuel tank 17.

A pair of front forks 21 are supported by the head pipe 11 via a steering shaft (not shown) so as to be steered, and a front wheel 22 is rotatably supported on lower portions of the front forks 21. A swing arm (not shown) is swingably supported at a rear half portion of the main tube 12, and a rear wheel 23 is rotatably supported at a rear end of the swing arm. The engine 30 is connected to the rear wheel 23 via a transmission mechanism, and power from the engine 30 is transmitted to the rear wheel 23 via the transmission mechanism. An exhaust device 50 is connected to the engine 30, and exhaust gas from the engine 30 is discharged to the outside through the exhaust device 50.

A method of expanding a catalyst capacity of a catalyst case disposed on a lower side of the engine, a method of disposing a primary catalyst case in front of the engine and disposing a secondary catalyst case on the lower side of the engine, and the like are used in order to comply with exhaust gas regulations in recent years. In these methods, the lower side of the engine is used to expand the catalyst capacity, and it is difficult to secure a muffling chamber with a sufficient volume upstream of a muffler unless a basic structure of the vehicle body frame and the engine is changed. Therefore, the size of the muffler is increased, a degree of freedom in designing the muffler appearance is reduced, and an influence of the heat damage to a rider and other components is increased.

Therefore, in the exhaust device 50 of the present embodiment, a front space of the engine 30 and a front side of a lower space of the engine 30 are effectively used, and a catalyst case is compactly disposed in front of the engine 30 in comparison with a general exhaust device. In the lower space of the engine 30, a chamber 71 (see FIG. 3) having only a muffling function without a catalyst is disposed, and a muffling chamber having a sufficient volume is secured on an upstream of a muffler 82 by the chamber 71. Accordingly, it is possible to reduce a size of the muffler 82 by reducing the muffling chamber in the muffler 82 while minimizing changes to the basic structure of the vehicle body frame 10 or the engine 30.

Figure 2:
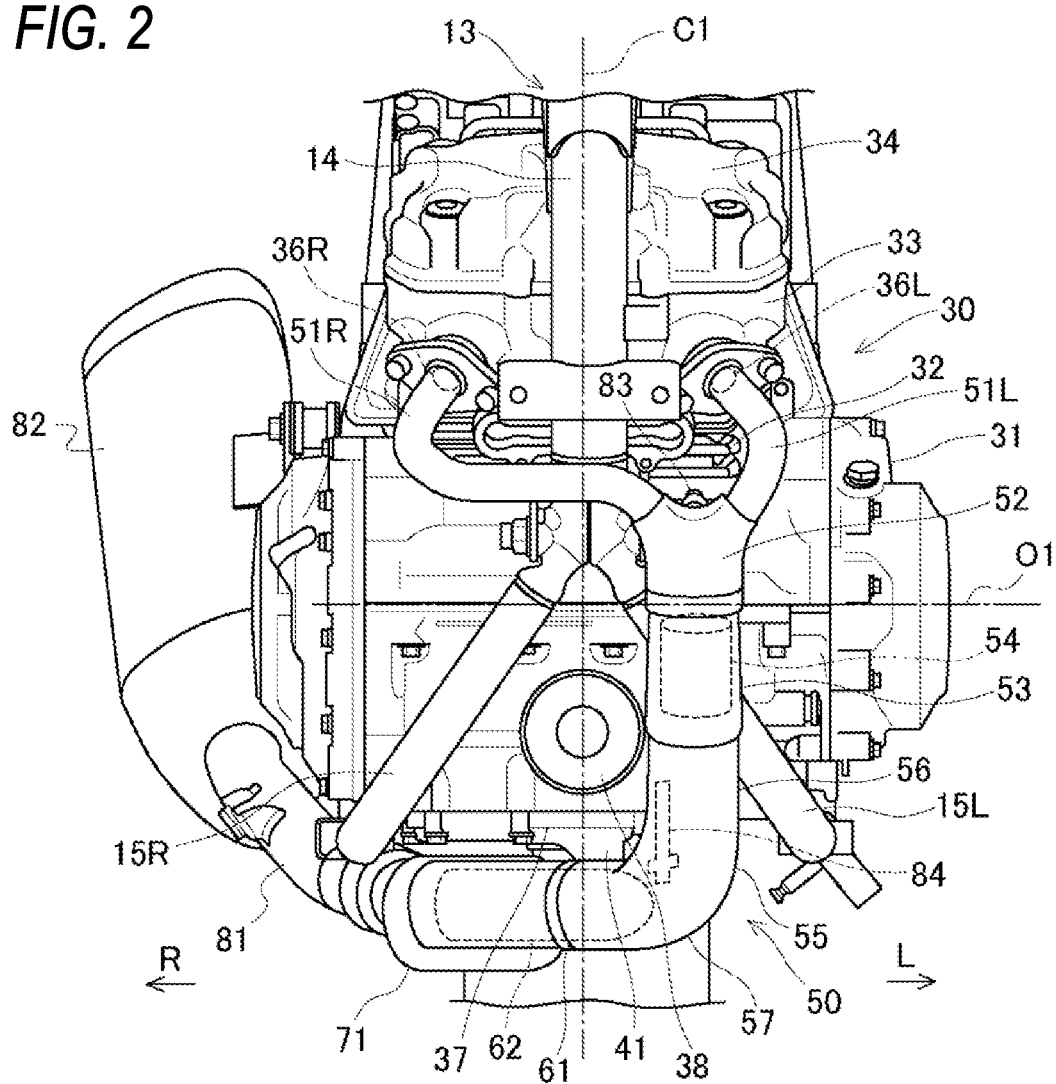
FIG. 2 is a front view of an engine according to the present embodiment.
Figure 3:
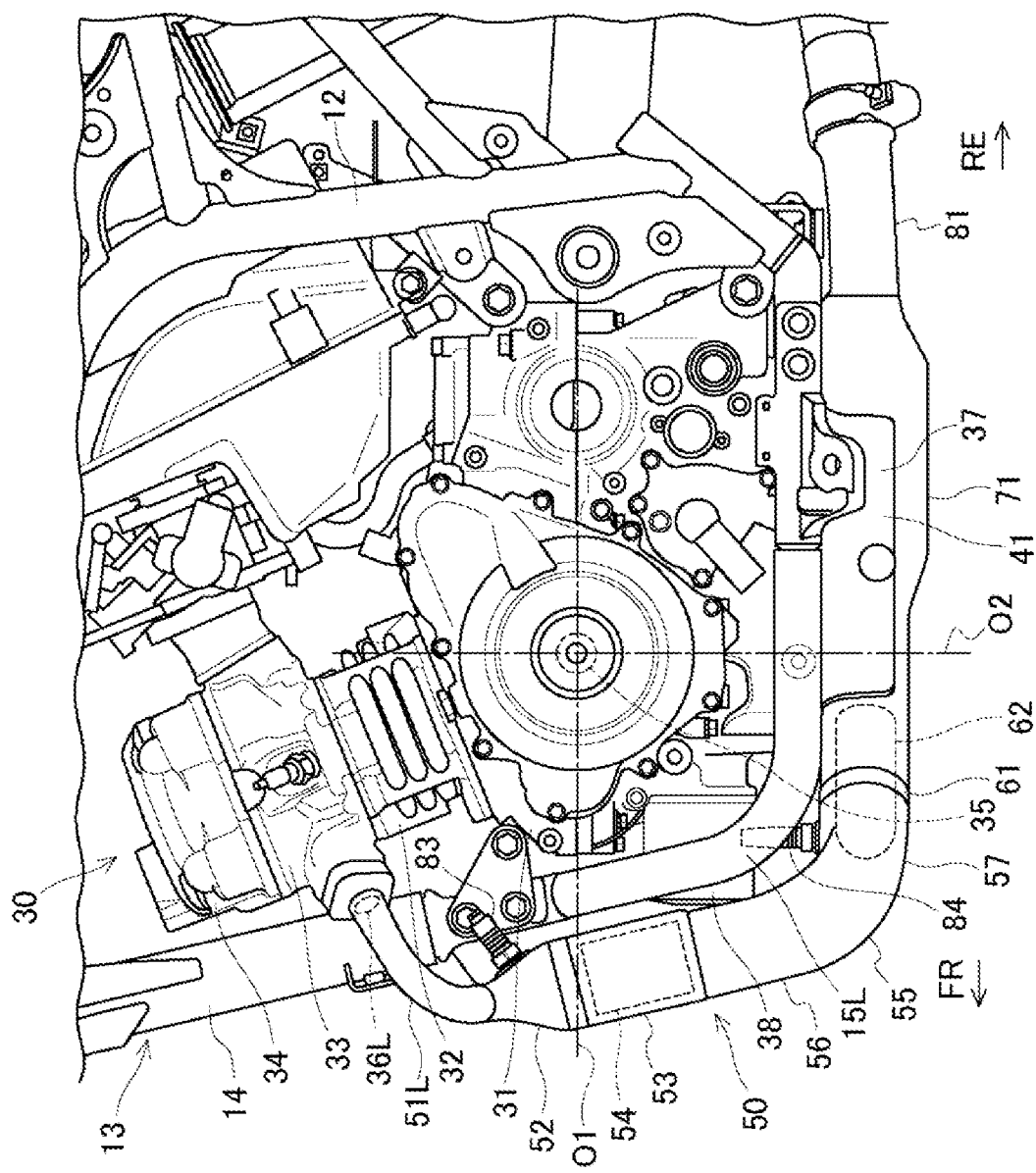
FIG. 3 is a side view of the engine according to the present embodiment.
Figure 4:
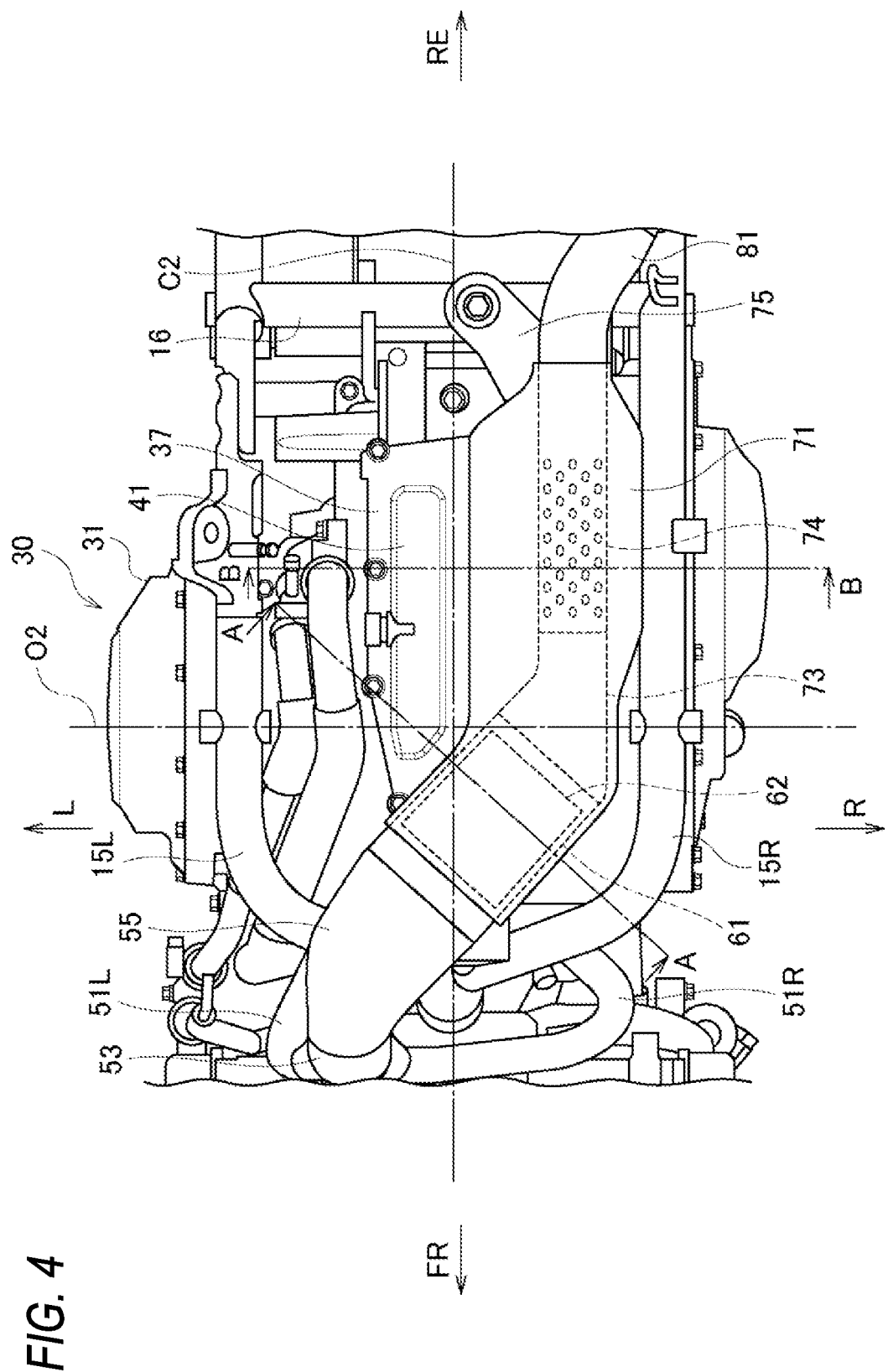
FIG. 4 is a bottom view of the engine according to the present embodiment.

Hereinafter, the engine and the exhaust device will be described with reference to FIGS. 2 to 4. FIG. 2 is a front view of the engine according to the present embodiment. FIG. 3 is a side view of the engine according to the present embodiment. FIG. 4 is a bottom view of the engine according to the present embodiment.

As shown in FIGS. 2 and 3, the engine 30 is a parallel two-cylinder engine and is formed by assembling a cylinder block 32, a cylinder head 33, and a head cover 34 on a crankcase 31. A drive component such as a crankshaft 35 is accommodated in the crankcase 31, and the cylinder block 32 is attached to an upper portion of the crankcase 31. A pair of aligned cylinder bores (not shown) disposed in a left-right direction (engine width direction) are formed in the cylinder block 32, and a piston (not shown) connected to the crankshaft 35 is disposed in each cylinder bore. The cylinder head 33 is attached to an upper portion of the cylinder block 32.

A pair of intake ports (not shown) connected to the pair of cylinder bores are formed on a rear surface side of the cylinder head 33, and a pair of exhaust ports 36L and 36R connected to the pair of cylinder bores are formed on a front surface side of the cylinder head 33. The head cover 34 is attached to an upper portion of the cylinder head 33, and a valve gear or the like is accommodated in the cylinder head 33 and the head cover 34. An oil pan 37 that stores oil for lubrication and cooling is attached to a lower portion of the crankcase 31. An oil filter 38 that removes a foreign matter from the oil is attached to a lower portion of a front surface of the crankcase 31.

The engine 30 is assembled inside the vehicle body frame 10. The down tube 13 of the vehicle body frame 10 includes an upper down tube 14 extending downward from the head pipe 11 (see FIG. 1) in a center of the engine 30 in the left-right direction, and a pair of lower down tubes 15L and 15R branching left and right from a lower end of the upper down tube 14 and extending obliquely downward. The lower down tubes 15L and 15R are bent rearward on the lower side of the engine 30, and are joined to the main tube 12 at rear end portions of the lower down tubes 15L and 15R. The oil filter 38 is positioned between the lower down tubes 15L and 15R.

A pair of exhaust pipes 51L and 51R extend from a front surface of the cylinder head 33 so as to avoid the upper down tube 14 and the lower down tubes 15L and 15R, and the exhaust device 50 that guides exhaust gas from the exhaust pipes 51L and 51R to the muffler 82 in a rear of the engine 30 is provided. The exhaust device 50 is provided with a small primary catalyst 54 that functions as a starter catalyst and a large secondary catalyst 62 that functions as a main catalyst. The exhaust gas enters the exhaust device 50 from the exhaust ports 36L and 36R, and the primary catalyst 54 and the secondary catalyst 62 purify air pollutants such as carbon monoxide (CO), hydrocarbons (HC), and nitrogen compounds (NOx) in the exhaust gas.

In the exhaust device 50, the exhaust pipes 51L and 51R, a collecting pipe 52, a primary catalyst case 53, a bent pipe 55, a secondary catalyst case 61, the chamber 71, an exhaust pipe 81, and the muffler 82 form an exhaust passage that wraps around from the front to the lower side of the engine 30 and extends to the rear. The exhaust pipe 51L extends forward from the exhaust port 36L and is connected to the collecting pipe 52, and the exhaust pipe 51R extends forward from the exhaust port 36R and then extends to a left and is connected to the collecting pipe 52. Thus, the exhaust pipe 51L is shorter than the exhaust pipe 51R, and pipe lengths of the exhaust pipes 51L and 51R are different. The exhaust pipes 51L and 51R have a circular cross section.

An upstream side of the collecting pipe 52 is bifurcated, and a downstream side of the collecting pipe 52 is formed in a cylindrical shape. The exhaust pipes 51L and 51R are connected to the upstream side of the collecting pipe 52, and the primary catalyst case 53 is connected to a downstream end of the collecting pipe 52. The exhaust gas that passes through the exhaust pipes 51L and 51R is collected by the collecting pipe 52 and sent to the primary catalyst case 53. A first oxygen sensor 83 is disposed between the exhaust pipes 51L and 51R on a wall surface of the collecting pipe 52, and an average oxygen concentration of the exhaust gas flowing in from the exhaust pipes 51L and 51R is detected by the first oxygen sensor 83. A detection result of the first oxygen sensor 83 is used for feedback control of a fuel injection amount.

The primary catalyst case 53 is formed in a cylindrical shape, and is connected to the collecting pipe 52 in a substantially vertical posture. Since the exhaust pipe 51L is shorter than the exhaust pipe 51R, the primary catalyst case 53 and the collecting pipe 52 are disposed on a left side (one side in the engine width direction) of a center line C1 of the engine 30 extending in an upper-lower direction. The primary catalyst 54 for purifying the exhaust gas that passes through the exhaust pipes 51L and 51R is accommodated in the primary catalyst case 53. The primary catalyst 54 is formed by adhering a catalyst substance to a surface of a honeycomb-shaped or lattice-shaped partition plate, and when the exhaust gas flowing in from the collecting pipe 52 passes through the primary catalyst 54, the air pollutant reacts with oxygen and is purified.

Since the pipe length of the exhaust pipe 51L is short, high-temperature exhaust gas flows into the primary catalyst case 53 from the exhaust port 36L, the primary catalyst 54 in the primary catalyst case 53 is warmed up in a short time, and a purification performance of the exhaust gas from the exhaust port 36L is improved. In this case, the pipe length of the exhaust pipe 51R is long and a temperature of the exhaust gas is likely to decrease, but the primary catalyst 54 is warmed up in a short time by the high-temperature exhaust gas from the exhaust pipe 51L, and a purification performance of the exhaust gas from the exhaust port 36R is also improved. Thus, an early activation of the primary catalyst 54 is implemented by intentionally adding a difference in the pipe lengths to the exhaust pipes 51L and 51R.

The bent pipe 55 is formed in an L-shaped tubular shape in which a vertical tubular portion 56 on an upstream side and a horizontal tubular portion 57 on a downstream side are connected. A cross-sectional shape of the bent pipe 55 gradually changes from a circular shape to an elliptical shape from an upstream end toward a downstream end. The primary catalyst case 53 is connected to the upstream end of the vertical tubular portion 56 having a circular cross section, the secondary catalyst case (catalyst case) 61 is connected to the downstream end of the horizontal tubular portion 57 having an elliptical cross section, and the exhaust gas that passes through the primary catalyst 54 is guided to the secondary catalyst 62 on the lower side of the engine 30 by the bent pipe 55. A second oxygen sensor 84 is disposed on a wall surface of the horizontal tubular portion 57, and an oxygen concentration of the exhaust gas that passes through the primary catalyst case 53 is detected by the second oxygen sensor 84. A detection result of the second oxygen sensor 84 is used for feedback control of the fuel injection amount and diagnosis of catalyst deterioration.

As shown in FIGS. 3 and 4, the secondary catalyst case 61 is formed in an elliptical cylindrical shape, and is connected to the bent pipe 55 in a substantially horizontal posture. At this time, the secondary catalyst case 61 extends obliquely rearward from the left side toward a right side (the one side to the other side in the engine width direction). The secondary catalyst 62 for purifying the exhaust gas that passes through the bent pipe 55 is accommodated in the secondary catalyst case 61. The secondary catalyst 62 is formed by adhering the catalyst substance to a surface of a honeycomb-shaped or lattice-shaped partition plate, and when the exhaust gas flowing in from the bent pipe 55 passes through the secondary catalyst 62, the air pollutant reacts with oxygen and is purified.

The chamber 71 is formed in an elliptical cylindrical shape, and is connected to the secondary catalyst case 61 in a substantially horizontal posture. A muffling chamber 72 (see FIG. 6) for reducing the exhaust noise is formed in the chamber 71. The chamber 71 extends in a front-rear direction, and an upstream end of the chamber 71 is joined to an outer wall surface of the secondary catalyst case 61 so as to cover the outer wall surface of the secondary catalyst case 61. The chamber 71 is disposed on a right side (the other side in the engine width direction) of a center line C2 of the engine 30 extending in the front-rear direction. A tapered pipe 73 connected to a downstream end of the secondary catalyst case 61 and a punching pipe 74 connected to a downstream end of the tapered pipe 73 are provided inside the chamber 71.

A cross-sectional shape of the tapered pipe 73 gradually changes from an elliptical shape to a circular shape from an upstream end toward the downstream end. A large number of small holes are formed in a peripheral surface of the punching pipe 74, and an inner side of the punching pipe 74 and the muffling chamber 72 are connected to each other through the large number of small holes. When the exhaust gas enters the muffling chamber 72 from the punching pipe 74, the exhaust gas is expanded in the muffling chamber 72, so that the exhaust noise is reduced. An outer wall of the chamber 71 has a double-cylinder structure, and a gap between an inner cylinder and an outer cylinder is filled with glass wool for sound absorption. The chamber 71 is supported by the vehicle body frame 10 via a bracket 75.

The exhaust pipe 81 is formed in a cylindrical shape and extends rearward from a downstream end of the chamber 71. The muffler 82 (see FIG. 1) is positioned on a right side of the rear wheel 23, and is connected to a downstream end of the exhaust pipe 81. A muffling chamber (not shown) for reducing the exhaust noise is formed in the muffler 82, and a rear end of the muffling chamber is connected to the outside through an exhaust port. Although a structure of the muffler 82 is not particularly limited, one muffling chamber may be formed, or a plurality of muffling chambers may be formed inside the muffler 82. Thus, the exhaust noise is reduced in two stages by the chamber 71 and the muffler 82 in the exhaust device 50.

Figure 5:
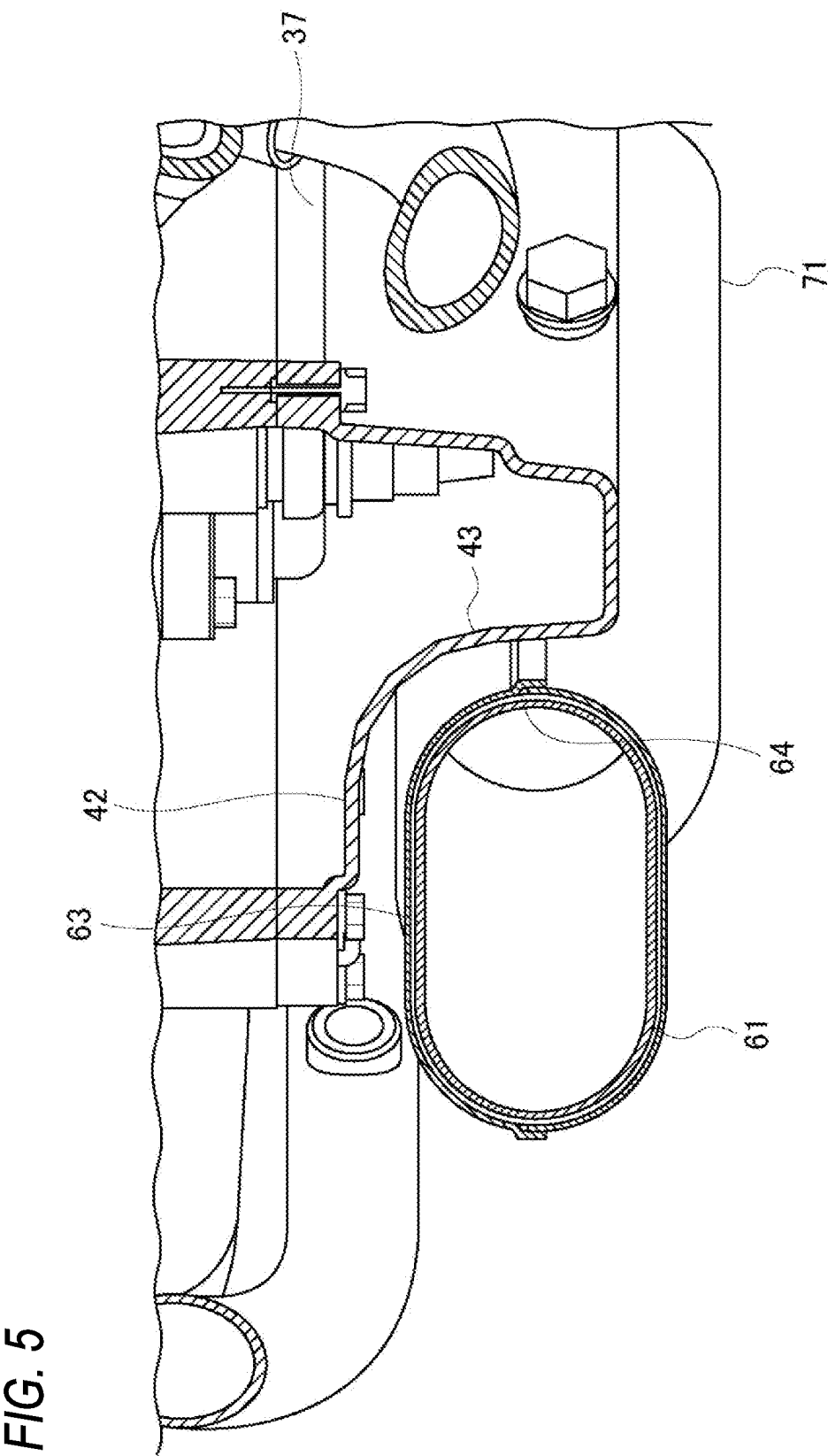
FIG. 5 is a cross-sectional view taken along a line A-A of FIG. 4.
Figure 6:
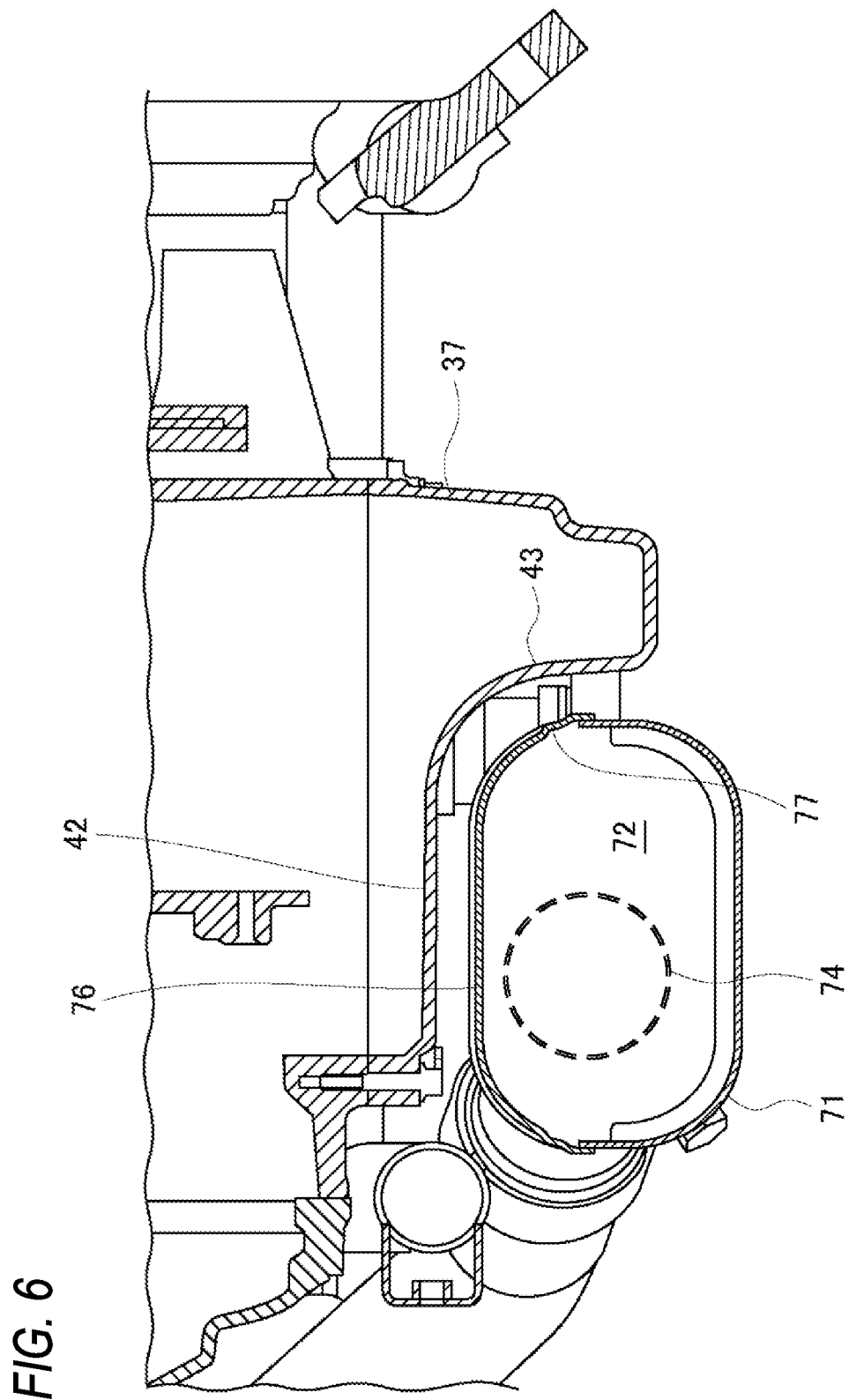
FIG. 6 is a cross-sectional view taken along a line B-B of FIG. 4.

An arrangement configuration of the catalyst case and the chamber will be described with reference to FIGS. 2 to 6. FIG. 5 is a cross-sectional view taken along a line A-A of FIG. 4. FIG. 6 is a cross-sectional view taken along a line B-B of FIG. 4. In FIG. 5, the primary catalyst is omitted.

As shown in FIG. 2, the lower down tubes 15L and 15R branching from the lower end of the upper down tube 14 extend obliquely downward. A branching point of the lower down tubes 15L and 15R are positioned below the exhaust ports 36L and 36R and above a height position O1 at a center of the crankshaft 35. The oil filter 38 is provided on the front surface of the crankcase 31 in a V-shaped space between the lower down tubes 15L and 15R. The oil filter 38 is positioned on the center line C1 of the engine 30 extending in the upper-lower direction. Since the exhaust device 50 avoids a front of the oil filter 38, an entry path for a tool to the oil filter 38 is secured.

The oil pan 37 is attached to a lower surface of the crankcase 31. A bottom surface of the oil pan 37 includes a deep bottom portion 41 on the left side (the one side in the engine width direction), and an inclined portion 43 which is inclined so that the bottom surface of the oil pan 37 becomes shallow from the deep bottom portion 41 toward the right side (the other side in the engine width direction) (see FIG. 6). The deep bottom portion 41 has a depth deeper than another portion of the bottom surface of the oil pan 37. A right side of the bottom surface of the oil pan 37 is recessed in an arch shape, and the exhaust device 50 passes through a recess of the oil pan 37. Thus, on the lower side of the engine 30, a space for disposing the exhaust device 50 is formed on a right side of the deep bottom portion 41 of the oil pan 37. A positional relationship between the exhaust device 50 and the oil pan 37 will be described in detail later.

As shown in FIGS. 2 and 3, the primary catalyst case 53 is disposed in front of the lower down tube 15L. An upstream end of the primary catalyst case 53 substantially coincides with the height position O1 at the center of the crankshaft 35. The bent pipe 55 is bent in an L shape from the downstream end of the primary catalyst case 53 to the right side, and a downstream end of the bent pipe 55 is positioned below the oil filter 38. Since the bent pipe 55 extends obliquely to reduce an occupied area in the front and rear, the secondary catalyst case 61 connected to the downstream end of the bent pipe 55 is compactly disposed in the front. A rearmost portion of the downstream end of the secondary catalyst case 61 substantially coincides with a front-rear position O2 at the center of the crankshaft 35.

As shown in FIG. 4, the secondary catalyst case 61 is disposed between the lower down tubes 15L and 15R so as to overlap the oil pan 37. The secondary catalyst case 61 extends obliquely rearward from the left side to the right side, and the secondary catalyst case 61 intersects the center line C2 of the engine 30 extending in the front-rear direction. Since the secondary catalyst case 61 is obliquely disposed, an occupied area of the secondary catalyst case 61 in the front-rear direction can be reduced, and an occupied area of the chamber 71 can be widely secured in a rear of the secondary catalyst case 61. The secondary catalyst 62 accommodated inside the secondary catalyst case 61 is also obliquely disposed similarly to the secondary catalyst case 61.

The chamber 71 extends in the front-rear direction, and is disposed on the right side of the center line C2 of the engine 30 extending in the front-rear direction. The upstream end of the chamber 71 is positioned in front of the front-rear position O2 at the center of the crankshaft 35, and the downstream end of the chamber 71 extends to a bridge 16 connecting the lower down tubes 15L and 15R. An entire length of the chamber 71 is set to a size that does not interfere with a center stand (not shown). The catalyst is not accommodated in the muffling chamber 72 in the chamber 71, and the muffling chamber 72 is an expansion space of the exhaust gas. The chamber 71 functions as a primary muffler that assists a muffling function of the muffler 82.

The upstream end of the chamber 71 is joined to the outer wall surface of the secondary catalyst case 61, and the muffling chamber 72 in the chamber 71 is widely secured to improve the muffling performance. More specifically, the chamber 71 is continuously connected to the secondary catalyst case 61, and a space around the tapered pipe 73 (outside in a radial direction) disposed inside the chamber 71 is also used as the muffling chamber 72. The exhaust gas flows smoothly from the secondary catalyst case 61 toward the chamber 71 by directly connecting the secondary catalyst case 61 and the chamber 71 without interposing another member such as a connecting pipe between the secondary catalyst case 61 and the chamber 71.

Thus, the primary catalyst case 53 is disposed in the front space of the engine 30, the secondary catalyst case 61 is disposed on the front part of the lower space of the engine 30, and the chamber 71 is disposed on the rear part of the lower space of the engine 30. More specifically, most of the primary catalyst case 53 is disposed in front of the engine 30 below the center of the crankshaft 35, and most of the secondary catalyst case 61 is disposed on a front side of the center of the crankshaft 35 (see FIG. 3). Then, most of the chamber 71 is disposed on the lower side of the engine 30 and on a rear side of the center of the crankshaft 35, and the muffling chamber 72 (see FIG. 6) having a sufficient volume is secured on the rear part of the lower space of the engine 30 in the exhaust passage.

In the exhaust device 50, a required volume of the muffling chamber is secured by the chamber 71 and the muffler 82. Since the chamber 71 serves as the primary muffler, a volume of the muffler 82 downstream of the chamber 71 can be reduced. In a state where a muffling performance of the exhaust device 50 is maintained, a risk of heat damage is reduced by reducing a surface area of the muffler 82, and a degree of freedom in designing of the muffler 82 is improved. In addition, the risk of the heat damage is reduced by intensively disposing the high-temperature catalyst in the vicinity of the engine 30. Further, a weight balance is optimized by positioning a center of gravity of the secondary catalyst 62 on the front side of the center of the crankshaft 35.

As shown in FIG. 5, the secondary catalyst case 61 is positioned inside an arch-shaped recess of the oil pan 37. The secondary catalyst case 61 has an elliptical cross-sectional shape having a width larger than a height of the secondary catalyst case 61. A major axis of the secondary catalyst case 61 is oriented in a substantially horizontal direction, and a minor axis of the secondary catalyst case 61 is oriented in a substantially vertical direction. An upper surface 63 of the secondary catalyst case 61 faces a bottom surface 42 of the oil pan 37 in a wide range, and heat dissipation from the upper surface 63 of the secondary catalyst case 61 is propagated to the bottom surface 42 of the oil pan 37. In addition, a side surface 64 of the secondary catalyst case 61 faces the inclined portion 43 of the oil pan 37, and heat dissipation from the side surface 64 of the secondary catalyst case 61 is propagated to the inclined portion 43 of the oil pan 37.

As shown in FIG. 6, the chamber 71 is positioned inside the arch-shaped recess of the oil pan 37. The chamber 71 has an elliptical cross-sectional shape having a width dimension larger than a height dimension. A major axis of the chamber 71 is oriented in a substantially horizontal direction, and a minor axis of the chamber 71 is oriented in a substantially vertical direction. An upper surface 76 of the chamber 71 faces the bottom surface 42 of the oil pan 37 in a wide range, and heat dissipation from the upper surface 76 of the chamber 71 is propagated to the bottom surface 42 of the oil pan 37. In addition, a side surface 77 of the chamber 71 faces the inclined portion 43 of the oil pan 37, and heat dissipation from the side surface 77 of the chamber 71 is propagated to the inclined portion 43 of the oil pan 37.

In a front view, the secondary catalyst case 61 overlaps the deep bottom portion 41 of the oil pan 37 (see FIG. 2). More specifically, the secondary catalyst case 61 crosses a front of the deep bottom portion 41 of the oil pan 37 (see FIG. 4), and heat dissipation of the secondary catalyst case 61 is propagated to the oil pan 37 by running wind. Since the heat dissipation from the secondary catalyst case 61 and the chamber 71 is propagated to the oil pan 37, the oil in the oil pan 37 is increased to a suitable temperature in a short time. Since the minor axes (heights) of the secondary catalyst case 61 and the chamber 71 are small, the engine 30 is low, vehicle body stability during traveling is improved, and capacities of a fuel tank and an air cleaner are easily secured.

Next, an arrangement configuration of the first and second oxygen sensors will be described with reference to FIGS. 2 and 3.

As shown in FIGS. 2 and 3, the first oxygen sensor 83 is disposed in the collecting pipe 52 in front of the engine 30. The first oxygen sensor 83 is erected on the collecting pipe 52 in a state of facing the rear (an engine 30 side) between the exhaust pipes 51L and 51R. Since the first oxygen sensor 83 is sandwiched between the exhaust pipes 51L and 51R and the first oxygen sensor 83 is brought close to the engine 30, early activation of the first oxygen sensor 83 is achieved by heat dissipation from the exhaust pipes 51L and 51R and the engine 30. When the exhaust gas from the exhaust pipes 51L and 51R is substantially uniform at a detection end of the first oxygen sensor 83, a detection accuracy of the oxygen concentration by the first oxygen sensor 83 is improved.

Since the first oxygen sensor 83 is disposed on a rear side of the collecting pipe 52, the first oxygen sensor 83 is protected from a flying object from the front by the collecting pipe 52. Since the bent pipe 55 is present below the first oxygen sensor 83, the first oxygen sensor 83 is protected from a flying object from below by the bent pipe 55. The upper down tube 14 is positioned on a right side of the first oxygen sensor 83, and the first oxygen sensor 83 overlaps the upper down tube 14 in a side view. Accordingly, since wiring is laid along the upper down tube 14, the wiring is easily connected to the first oxygen sensor 83.

The second oxygen sensor 84 is disposed on the horizontal tubular portion 57 downstream of a bent portion of the bent pipe 55. The second oxygen sensor 84 is erected on the horizontal tubular portion 57 in a state of facing upward (the engine 30 side). When the second oxygen sensor 84 is brought close to the engine 30, early activation of the second oxygen sensor 84 is achieved by the heat dissipation from the engine 30. In the front view, the second oxygen sensor 84 overlaps the vertical tubular portion 56 upstream of the bent portion of the bent pipe 55. The second oxygen sensor 84 is protected from a flying object from below by the horizontal tubular portion 57, and the second oxygen sensor 84 is protected from a flying object from above by the vertical tubular portion 56.

The second oxygen sensor 84 is positioned between the lower down tubes 15L and 15R, and the second oxygen sensor 84 overlaps the lower down tubes 15L and 15R in the side view. The second oxygen sensor 84 is protected from a flying object from the left and right sides by the lower down tubes 15L and 15R. Since the second oxygen sensor 84 is closer to the left side and wiring is laid along the lower down tube 15L, the wiring is easily connected to the second oxygen sensor 84. Since the first and second oxygen sensors 83 and 84 are disposed on a left side of the engine 30, a deviation of the first and second oxygen sensors 83 and 84 in the left-right direction is reduced, and the wiring is easily collected.

The oil filter 38 is positioned on a right side of the second oxygen sensor 84, and the second oxygen sensor 84 overlaps the oil filter 38 in the side view. The second oxygen sensor 84 is protected from a flying object from the right by the oil filter 38. The oil filter 38 protrudes toward the front from the front surface of the crankcase 31, and the second oxygen sensor 84 is positioned in a rear of a front end of the oil filter 38. Accordingly, the second oxygen sensor 84 protruding directly upward from the horizontal tubular portion 57 does not cross front space of the oil filter 38, and the entry path for the tool to the oil filter 38 is secured.

As described above, according to the present embodiment, the secondary catalyst case 61 is disposed on the front part of the lower space of the engine 30, and the lower space of the engine 30 is not occupied by the secondary catalyst case 61. The chamber 71 is disposed in a wide range of the lower space of the engine 30, and the exhaust noise is reduced by the muffling chamber 72 of the chamber 71. By securing the muffling chamber 72 on an upstream side of the muffler 82, it is possible to reduce the size of the muffler 82. Therefore, in the state where the muffling performance is maintained, the risk of heat damage due to the surface of the muffler can be reduced by reducing the size of the muffler 82, and the degree of freedom in designing the muffler appearance can be improved.

Figure 7:
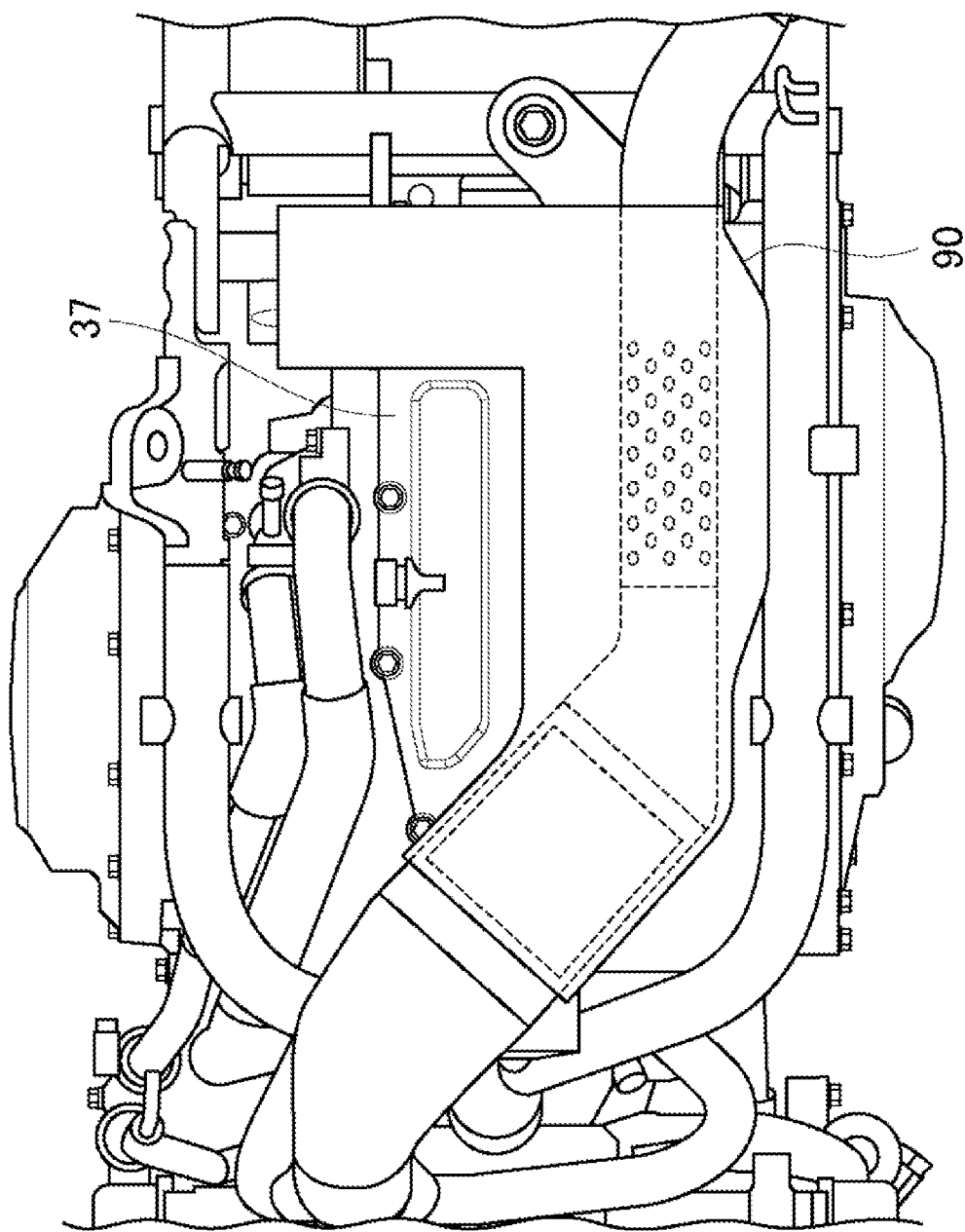
FIG. 7 is a bottom view of an engine according to a modification.

In the present embodiment, the chamber is positioned on the right side of the deep bottom portion of the oil pan, but a shape of the chamber is not particularly limited. For example, as long as an attachment portion of the center stand can be relocated, as shown in a modification of FIG. 7, a rear portion of a chamber 90 protrudes to a left side in a rear side of the oil pan 37, and the muffling chamber in the chamber 90 may be further widened. In this case, the muffler on a side of the rear wheel can be eliminated to centralize a mass, the reduction of the risk of the heat damage due to the surface of the muffler, and an improvement of the degree of freedom in designing the muffler appearance can be achieved.

In the present embodiment, most of the secondary catalyst case is disposed on the front side of the center of the crankshaft, but the secondary catalyst case may be disposed in a range from the front space to the front part of the lower space of the engine. For example, the secondary catalyst case may be disposed in the front space of the engine. Accordingly, by disposing the chamber in the wide range of the lower space of the engine, it is possible to further improve the muffling performance. The front part of the lower space of the engine refers to a space on a front side of an intermediate position in the front-rear direction in the lower space of the engine.

In the present embodiment, most of the chamber is disposed on the rear side of the center of the crankshaft, but the chamber may occupy at least the rear part of the lower space of the engine. For example, the chamber may be disposed on the front side and the rear part of the lower space of the engine. The rear part of the lower space of the engine refers to a space on a rear side of the intermediate position in the front-rear direction in the lower space of the engine.

In the present embodiment, a press component may be used for a pipe of the exhaust device. The number of components and welding points can be reduced.

In the present embodiment, the left side of the bottom surface of the oil pan is formed at the deep bottom, but a part of the bottom surface of the oil pan may be formed at the deep bottom. For example, if the exhaust device does not interfere with the oil pan, the right side of the bottom surface of the oil pan may be formed at the deep bottom.

In the present embodiment, the upstream end of the chamber is joined to the outer wall surface of the secondary catalyst case, but the chamber and the secondary catalyst case may be separated from each other, and the chamber and the secondary catalyst case may be connected to via a connecting pipe.

In the present embodiment, the primary catalyst case and the secondary catalyst case are provided in the exhaust device, but at least one catalyst case may be provided in the exhaust device.

In the present embodiment, the engine is the parallel two-cylinder engine, but a type of engine is not particularly limited, and for example, the engine may be a single-cylinder engine.

In the present embodiment, the cross-sectional shape of the secondary catalyst case and the cross-sectional shape of the chamber are formed in an elliptical shape, but the cross-sectional shape of the secondary catalyst case and the cross-sectional shape of the chamber may be formed in a cross-sectional shape having the width larger than the height. Depending on a shape of the frame, a shape of a bottom surface of the engine, and a minimum ground clearance, the cross-sectional shape of the secondary catalyst case and the cross-sectional shape of the chamber may be formed in a circular shape.

In the present embodiment, the secondary catalyst case crosses the front of the deep bottom portion of the oil pan, but a positional relationship between the secondary catalyst case and the deep bottom portion of the oil pan is not particularly limited. When the heat dissipation from the secondary catalyst case is propagated to the oil pan by the running wind, the secondary catalyst case may overlap the deep bottom portion of the oil pan in the front view.

In the present embodiment, the secondary catalyst case extends obliquely rearward from the left side to the right side, but the secondary catalyst case may extend in the front-rear direction.

In the present embodiment, the oxygen sensor is illustrated as a gas sensor, but the gas sensor may be any sensor that can detect an average characteristic of the exhaust gas, and may be, for example, an exhaust noise sensor that detects the exhaust noise of the exhaust gas.

The exhaust device of the present embodiment is not limited to the engine of the above straddle-type vehicle, but may be adopted for an engine of another type of straddle-type vehicle. The straddle-type vehicle is not limited to a motorcycle, and may be any vehicle on which an engine is mounted. The straddle-type vehicle is not limited to general vehicles on which a driver rides in a posture of straddling a seat, and includes a scooter-type vehicle on which the driver rides without straddling the seat.

As described above, the exhaust device (50) of the present embodiment is an exhaust device that guides the exhaust gas from the exhaust pipe (51L, 51R) in front of the engine (30) to the muffler (82) in the rear of the engine, and includes the catalyst case (secondary catalyst case 61) in which the catalyst (secondary catalyst 62) that purifies the exhaust gas that passes through the exhaust pipe is accommodated; and the chamber (71) in which the muffling chamber (72) that reduces the exhaust noise is formed downstream of the catalyst case, in which the catalyst case is disposed in the range from the front space to the front part of the lower space of the engine, and the chamber is disposed so as to occupy at least the rear part of the lower space of the engine. According to this configuration, the catalyst case is disposed on the front space or the front part of the lower space of the engine, and the lower space of the engine is not occupied by the catalyst case. The chamber is disposed in the wide range of the lower space of the engine, and the exhaust noise is reduced by the muffling chamber of the chamber. By securing the muffling chamber on the upstream side of the muffler, it is possible to reduce the size of the muffler. Therefore, in the state where the muffling performance is maintained, the risk of the heat damage due to the surface of the muffler can be reduced by reducing the size of the muffler, and the degree of freedom in designing the muffler appearance can be improved.

In the exhaust device of the present embodiment, the front space of the engine is in front of the engine below the center of the crankshaft (35), the front part of the lower space of the engine is on the lower side of the engine and on the front side of the center of the crankshaft, and the rear part of the lower space of the engine is on the lower side of the engine and on the rear side of the center of the crankshaft. According to this configuration, the chamber can be disposed in the wide range of the lower space of the engine by an amount that the catalyst case is disposed on the front side of the center of the crankshaft.

In the exhaust device of the present embodiment, the upstream end of the chamber is positioned on the front side of the center of the crankshaft. According to this configuration, the muffling chamber of the chamber can be widely secured.

In the exhaust device of the present embodiment, the upstream end of the chamber is joined to the outer wall surface of the catalyst case. According to this configuration, it is possible to extend the upstream end of the chamber to the catalyst case to secure a wide muffling chamber. The exhaust gas from the catalyst can flow smoothly into the chamber.

In the exhaust device of the present embodiment, the catalyst case extends obliquely rearward from the one side toward the other side in the engine width direction. According to this configuration, since the catalyst case is obliquely disposed, the occupied area of the secondary catalyst case in the front-rear direction can be reduced, and the occupied area of the chamber can be widely secured in the rear of the catalyst case.

In the exhaust device of the present embodiment, the catalyst case and the chamber have the cross-sectional shape having the width larger than the height. According to this configuration, the engine can be disposed low to improve the vehicle body stability during traveling.

In the exhaust device of the present embodiment, the oil pan (37) that stores the oil is provided at a lower portion of the engine, and the upper surfaces (63, 76) of the catalyst case and the chamber face the bottom surface (42) of the oil pan. According to this configuration, the heat dissipation from the upper surfaces of the catalyst case and the chamber can be propagated to the bottom surface of the oil pan, and the oil in the oil pan can be increased to the suitable temperature in the short time.

In the exhaust device of the present embodiment, a part of the bottom surface of the oil pan is formed at the deep bottom, and the catalyst case overlaps the deep bottom portion (41) of the oil pan in the front view. According to this configuration, the heat dissipation from the catalyst case can be propagated to the oil pan by the running wind, and the oil in the oil pan can be increased to the suitable temperature in the short time.

In the exhaust device of the present embodiment, the catalyst case crosses the front of the deep bottom portion. According to this configuration, the heat dissipation from the catalyst case can be mostly propagated to the oil pan by the running wind, and the oil in the oil pan can be increased to the suitable temperature in the short time.

In the exhaust device of the present embodiment, the deep bottom portion is formed on one side in the engine width direction of the bottom surface of the oil pan, and the bottom surface of the oil pan is inclined so as to become shallow from the deep bottom portion toward the other side in the engine width direction, and the side surfaces (64, 77) of the catalyst case and the chamber face the inclined portion (43) of the bottom surface of the oil pan. According to this configuration, the heat dissipation from the side surfaces of the catalyst case and the chamber can be propagated to the inclined portion of the bottom surface of the oil pan, and the oil in the oil pan can be increased to the suitable temperature in the short time.

Although the present embodiment has been described, the above-described embodiment and modification may be combined entirely or partially as another embodiment.

The technique of the present disclosure is not limited to the above-described embodiment, and various changes, substitutions, and modifications may be made without departing from the spirit of the technical idea of the present disclosure. Further, the present invention may be implemented using other methods as long as the technical idea can be implemented by the methods through advance of the technology or other derivative technology. Accordingly, the claims cover all embodiments that may be included within the scope of the technical concepts.

What is claimed is:
1. A straddle-type vehicle comprising:
an engine including a crankcase in which a crankshaft is accommodated; and
an exhaust device configured to guide exhaust gas from an exhaust pipe in front of the engine to a muffler in a rear of the engine, the muffler being formed with a first muffling chamber, the exhaust device including:
a catalyst case in which a catalyst configured to purify the exhaust gas that passes through the exhaust pipe is accommodated; and
a chamber in which a second muffling chamber configured to reduce an exhaust noise is formed, being disposed at a downstream side from the catalyst case and an upstream side from the muffler, wherein
the muffler is disposed at a downstream end of the exhaust device and at a rear end of the straddle-type vehicle, the catalyst case is disposed at a rear side of the catalyst case and at a front side of the muffler, and is disposed in a range from a front space of the engine to a front part of a lower space of the engine, the chamber is disposed so as to occupy at least a rear part of the lower space of the engine, and an upstream end of the chamber is positioned on the front side of a center of the crankshaft.

2. The straddle-type vehicle according to claim 1, wherein most of the catalyst case is disposed at in front of the engine and below the center of the crankshaft, and the most of the catalyst case is disposed at a lower side of the engine and on a front side of the center of the crankshaft.

3. The straddle-type vehicle according to claim 1, wherein the upstream end of the chamber is joined to an outer wall surface of the catalyst case.

4. The straddle-type vehicle according to claim 1, wherein the catalyst case extends obliquely rearward from one side toward another side in an engine width direction.

5. The straddle-type vehicle according to claim 1, wherein the catalyst case has a cross-sectional shape having a width larger than a height, and the chamber has a cross-sectional shape having a width larger than a height.

6. The straddle-type vehicle according to claim 1, further comprising an oil pan configured to store oil and provided at a lower portion of the engine, wherein an upper surface of the catalyst case and an upper surface of the chamber face a bottom surface of the oil pan.

7. The straddle-type vehicle according to claim 6, wherein the bottom surface of the oil pan includes a deep bottom portion having a depth deeper than another portion of the bottom surface, and the catalyst case overlaps the deep bottom portion of the oil pan in a front view.

8. The straddle-type vehicle according to claim 7, wherein the catalyst case crosses a front of the deep bottom portion.

9. The straddle-type vehicle according to claim 7, wherein the deep bottom portion is formed on one side in an engine width direction of the bottom surface of the oil pan, and the bottom surface of the oil pan includes an inclined portion which is inclined so as to become shallow from the deep bottom portion toward another side in the engine width direction, and a side surface of the catalyst case and a side surface of the chamber face the inclined portion of the bottom surface of the oil pan.

\* \* \* \* \*